May 13, 1958 R. R. GASPER 2,834,099
APPARATUS FOR INSERTING AND REMOVING PINS
Filed Oct. 8, 1953

INVENTOR:
R. R. GASPER
BY
C. B. Hamilton
ATT'Y

United States Patent Office 2,834,099
Patented May 13, 1958

2,834,099

APPARATUS FOR INSERTING AND REMOVING PINS

Robert R. Gasper, Clarendon Hills, Ill., assignor to Western Electric Company, Incorporated, New York, N. Y., a corporation of New York Application October 8, 1953, Serial No. 384,873

2 Claims. (Cl. 29—257)

This invention relates to apparatus for inserting and removing pins, and more particularly to a portable tool for inserting and removing pins from gear hubs and shafts.

In the assembling and disassembling of gears mounted on shafts inaccessible or difficult to reach, as for example, in the corner of a housing, it is very difficult and time consuming to remove pins from gears on shafts so that gears may be inspected or repaired. It has also been very difficult to repin the gears to the shafts, no satisfactory apparatus being provided for such operations.

An object of the invention is to provide new and improved apparatus for inserting and removing pins.

Another object of the invention is to provide new and improved apparatus for inserting and removing pins into and from gears mounted on shafts.

A further object of the invention is to provide apparatus for inserting and removing pins from gears or the like mounted in highly inaccessible positions.

An apparatus illustrating certain features of the invention may include a hook for hooking behind a gear hub or the like a plunger and means for forcing the plunger toward the hook to push a pin from a gear hub around which the hook is placed, or to insert it in the gear hub around which the pin is placed.

A complete understanding of the invention may be obtained from the following detailed description of an apparatus forming a specific embodiment thereof when read in conjunction with the appended drawings, in which—

Figure 1:
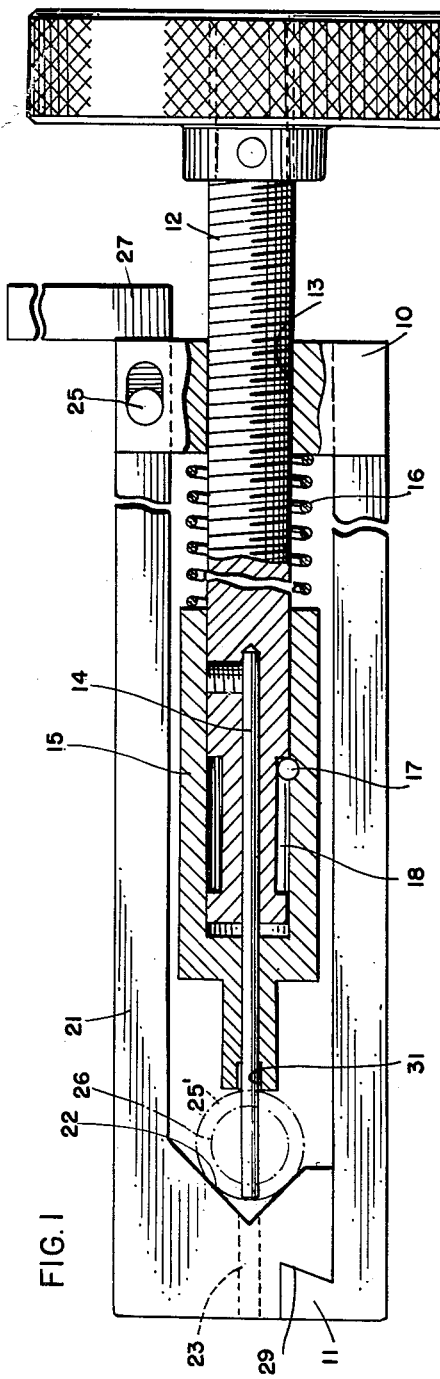
Figure 2:
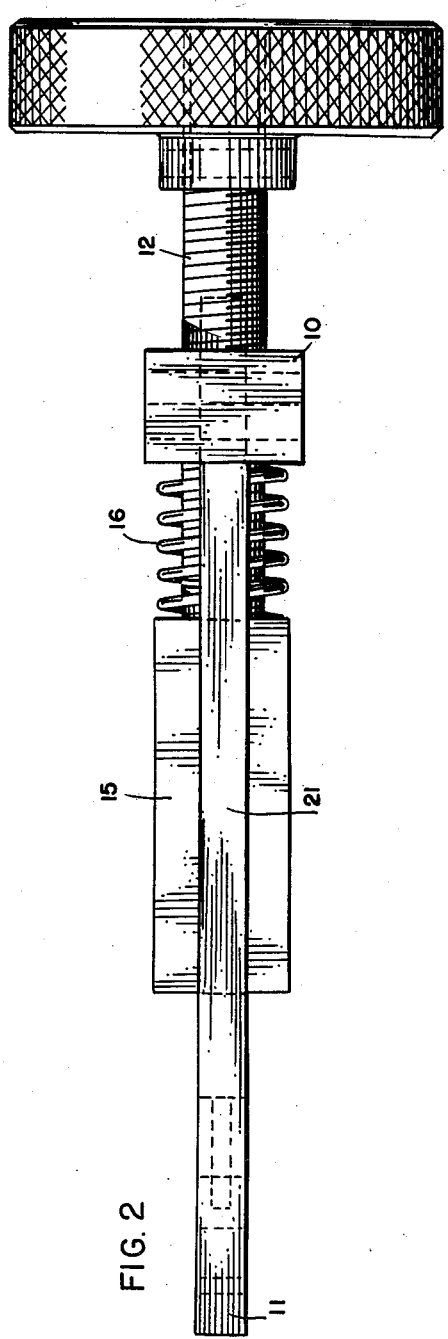

Fig. 1 is an elevational view of the device showing the various parts of the device in operating position, and Fig. 2 is a side view of the disclosure of Fig. 1.

Referring now in detail to the drawings, there is shown therein a tool for inserting pins into gear hubs, and the like, and for removing pins therefrom. The tool includes a frame 10 having a latch 11, and also carrying with an adjustment screw 12 threaded through a tapped bore 13 in the frame 10. The adjustment screw 12 has a push rod 14 projecting from the forward end thereof, and a guide sleeve 15 is mounted slidably on the adjustment screw and is pressed to the left, as viewed in Fig. 1, by a compression spring 16. A pin 17 movable along a reduced portion 18 of the screw 12 limits sliding movement of the guide sleeve 15 relative to the adjustment screw. A hook 21, which is provided with a V-shaped socket 22 and a bore 23 therein is mounted pivotally by a pin-and-slot connection 25 on the frame 10, and a handle 27 is secured rigidly to the hook 21.

To remove a pin, the hook 21 may be projected beyond a gear hub 25 mounted on a shaft 26 and pinned thereto, and the latch 11 is swung toward the hook to swing the latch into a notched portion 29 of the hook 21 into latched engagement with the hook 11. Then the screw 12 is turned until the tip of the sleeve engages the hub 25, and the shaft 26 is in a centered relationship with the pin to be removed. The screw 12 is turned further to push the rod 14 against the pin to force the pin completely from the hub and the shaft, the pin being extracted and passing through the bore 23 in the hook 21. The guide sleeve 15 also is provided with a socket 31 therein for receiving a pin to be inserted into the hub and the shaft, and a similar procedure is followed to insert the pin into these elements except, of course, that the screw is more retracted at the start to start the pin into the hub.

The tool may be disengaged from a hub by withdrawing the push rod from the hub, placing the palm of the hand on the adjustment screw and a finger thereof on the handle 27, and squeezing to pull the hook 21 to the right relative to the latch 11 and swing the latch away from the hook.

The tool described hereinabove rapidly extracts and inserts pins in ordinarily inaccessible places, and is simple in its operation and construction.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A tool for inserting and removing pins from elements, which comprises a bushing, a push rod carried by the bushing and movable relative thereto, a tubular guide for the push rod provided with a bore through which the push rod may slide and a counterbore in the free end thereof, means for urging the guide away from the bushing, an arm pivotally secured at one end to the bushing and having at its other end a hook movable into alignment with the push rod, said hook having a notch for receiving an element from which a pin is to be removed and also having a latching notch, and a handle projecting laterally from the arm at said one end thereof for moving the hook into and out of alignment with the push rod, said bushing having a projection extending into the latching notch in the hook for holding it in alignment with the push rod.

2. A tool for inserting and removing pins, which comprises a threaded bushing, an adjustment screw threaded to the bushing and carrying a push rod projecting from the forward end thereof, a tubular guide for the adjustment screw provided with a bore through which the push rod may slide and a counterbore in the free end thereof, means for urging the guide away from the bushing, an arm having a hook on one end thereof and a handle on the other end thereof, pin-and-slot means securing the arm to the bushing on one side thereof for pivotal and longitudinal movement relative to the bushing by said handle, and a second arm secured rigidly to the opposite side of the bushing, said hook and said second arm being provided with interlocking portions controllable by movement of said arm.

References Cited in the file of this patent

UNITED STATES PATENTS

| 1,355,631 | Wellbrook | Oct. 12, 1920 |
| 1,381,667 | Ryder | June 14, 1921 |
| 1,764,243 | Cornwell | June 17, 1930 |
| 2,091,844 | Blake | Aug. 31, 1937 |

FOREIGN PATENTS

| 311,712 | Germany | Apr. 7, 1919 |